United States Patent
Rüger

(10) Patent No.: US 12,409,626 B2
(45) Date of Patent: Sep. 9, 2025

(54) VEHICLE RIM WITH TURNED-OVER NCF SUBPREFORMS AT THE ENDS AND METHOD FOR THE PRODUCTION THEREOF

(71) Applicant: ADVANCED INTERNATIONAL MULTITECH CO., LTD., Kaohsiung (TW)

(72) Inventor: Olaf Rüger, Bruckmühl (DE)

(73) Assignee: ADVANCED INTERNATIONAL MULTITECH CO., LTD., Kaohsiung (TW)

( * ) Notice: Subject to any disclaimer, the term of this patent is extended or adjusted under 35 U.S.C. 154(b) by 877 days.

(21) Appl. No.: 17/486,130

(22) Filed: Sep. 27, 2021

(65) Prior Publication Data
US 2022/0097449 A1  Mar. 31, 2022

(30) Foreign Application Priority Data
Sep. 29, 2020 (DE) .......................... 102020125459.8

(51) Int. Cl.
B29D 99/00 (2010.01)
B29C 70/52 (2006.01)

(52) U.S. Cl.
CPC ........ B29D 99/0032 (2013.01); B29C 70/526 (2013.01)

(58) Field of Classification Search
CPC ... B29C 70/202; B29C 70/302; B29C 70/226; B29C 70/30; B29C 70/48; B29C 70/526;
(Continued)

(56) References Cited

U.S. PATENT DOCUMENTS 9,649,961 B2  5/2017 Ter Steeg et al.
2004/0036348 A1  2/2004 Schroeder et al.

FOREIGN PATENT DOCUMENTS

DE  10 2013 223 834  3/2015
WO  WO 2014/082115  6/2014
WO  2015/069111  5/2015

OTHER PUBLICATIONS

German Search Report from German Application No. 102020125459.8 dated Jul. 13, 2021.
(Continued)

*Primary Examiner* — Camie S Thompson
(74) *Attorney, Agent, or Firm* — Muncy, Geissler, Olds & Lowe, P.C.

(57) ABSTRACT

The invention refers to a vehicle rim (1) with a rim body (2) made of fiber composite material, comprising a first subpreform (3) at a first axial end and a third subpreform (5) at the opposite second axial end, wherein a second subpreform (4) is arranged between the first subpreform (3) and the third subpreform (5), wherein the second subpreform (3) engages into a front connecting cavity (6) formed by the first subpreform (3) as well as also into a rear connecting cavity (7) being formed by the third subpreform (5). The invention also refers to a method for the production of a vehicle rim (1) with a rim body (2) made of fiber composite material, wherein an NCF material (19) comprising carbon fibers, glass fibers and/or aramid fibers is created respectively for the formation of a first subpreform (3) for a first axial end of the rim body (2) and of a third subpreform (5) for the opposite axial end of the rim body (2) with a connecting cavity (6, 7), respectively, wherein a second subpreform (4) made of a same or a similar NCF material (19) is inserted into the connecting cavity (6 and/or 7) and is fixed thereat.

16 Claims, 5 Drawing Sheets

Figure 1:
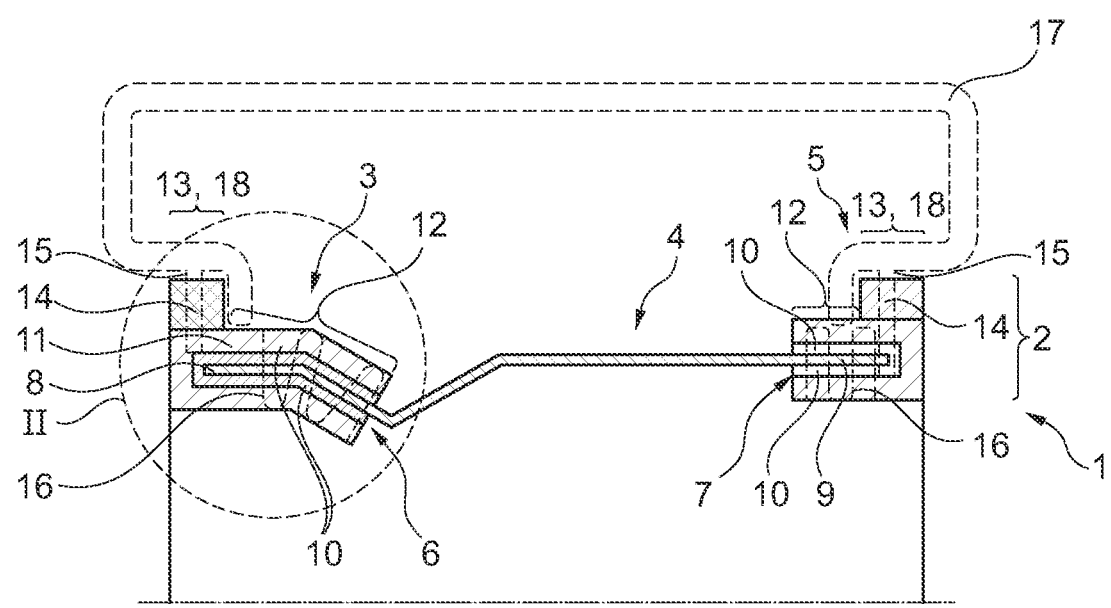

(58) Field of Classification Search
CPC ............. B29C 70/543; B60B 2360/341; B29L 2031/32; B29D 99/0032
USPC ..................................................... 428/292.1
See application file for complete search history.

(56) References Cited

OTHER PUBLICATIONS

Extended European Search Report dated Feb. 9, 2022 from European Application No. 21198507.2-1017.

VEHICLE RIM WITH TURNED-OVER NCF SUBPREFORMS AT THE ENDS AND METHOD FOR THE PRODUCTION THEREOF

The invention refers to a vehicle rim with a generally hollow, preferably (rotationally) symmetrical rim body made of fiber composite material.

From prior art there are basically known vehicle rims with a rim body made of fiber composite material. Said rim bodies normally comprise woven fabrics, non-crimp fabrics or braidings comprising carbon fibers, glass fibers or aramid fibers, preimpregnated with resin or subsequently injected with resin. After a curing process, a vehicle rim comprising said rim body is provided.

It is also known that the rim body made out of fiber composite material can be connected with another element which is provided for a fastening at the wheel hub of a vehicle, as for instance a car, a truck or another utility vehicle, but also for instance of two-wheeled motorized vehicles. Very often said element is formed as a star and is usually made of metal or a metal alloy like an aluminum alloy.

Up to now it has, however, been quite complex and cost-intensive to produce said (CFRP) rim bodies. Until now, such rim bodies have also not been capable of withstanding high loads and stresses to such a degree as desired. In particular it is necessary that they are still more robust against thermal stresses, pressures but also centripetal forces. And such a rim body shall be extremely rigid and lightweight.

Said object is solved by a vehicle rim according to the features of claim 1, namely by a vehicle rim with a generally hollow, preferably (rotationally) symmetrical rim body made of fiber composite material, comprising a first subpreform at a first axial end and a third subpreform at the opposite second axial end, wherein a second subpreform is arranged between the first subpreform and the third subpreform, wherein the second subpreform engages into a front connecting cavity being formed by the first subpreform or being formed or being present in the first subpreform as well as also into a rear connecting cavity being formed by the third subpreform or being formed or being present in the third subpreform.

On account of having the possibilities to use three different subpreforms, the work steps can be carried out in parallel which saves a lot of time. Such a vehicle rim also enables a continuous production process as well as a discontinuous production process. The vehicle rims thus created are particularly lightweight, rigid and capable of bearing high loads and stresses.

The invention also has the object to make available a particularly fast, cost-intensive and reliable, i.e. fail-safe method for the production of a vehicle rim with a rim body made of fiber composite material.

Said object is solved according to the invention by a method comprising the features of claim 10.

Such a method for the production of a vehicle rim with a rim body made of fiber composite material is characterized by the fact that an NCF (non-crimp fabric) comprising carbon fibers, glass fibers and/or aramid fibers is created respectively for the formation of a first subpreform for a first axial end of the rim body and of a third subpreform for the opposite axial end of the rim body with a connecting cavity, respectively, wherein a second subpreform made of the same or a similar NCF material is inserted into the connecting cavity and is fixed thereat, for instance by means of the activation of a (preferably thermal) binder and/or by means of the provision of a (3D) seam.

Advantageous further developments of the vehicle rim are claimed in the subclaims. Advantageous further developments of the method are also claimed in the subclaims. Said advantageous further developments will be explained in more detail in the following.

It is of advantage if the second subpreform is fixed or mounted in the two connecting cavities at the first subpreform and the third subpreform in particular in a one piece manner or in an integral manner. Then a good durability is guaranteed.

When all three subpreforms are penetrated by the same resin or resin mixture, a coherent, rigid but also particularly lightweight component is facilitated.

In order to keep costs low while still having a high load-bearing or stress-bearing capacity it has turned out to be advantageous if the first subpreform and/or the second subpreform and/or the third subpreform comprise an NCF or are made predominantly or completely made out of an NCF.

NCF is understood to mean "non-crimp fabric" (non-woven fabric). This is a flat structure that consists of one or more layers of parallel, stretched threads. The threads are usually fixed at the crossing points. The fixation takes place either by material connection or mechanically by friction and/or form fit.

The following types of thread arrangements exist:
monoaxial or unidirectional thread arrangements, which are created by fixing a set of parallel threads;
biaxial thread arrangements, in which two sets of parallel threads are fixed in the direction of two axes;
multiaxial thread arrangements, wherein several sets of parallel threads are fixed in the direction of different axes.

The thread layers in multi-layer non-crimp fabrics can all have different orientations, and they can also consist of different thread densities and different thread counts. Compared to woven fabrics, non-crimp fabrics have, as is well known, better mechanical properties as reinforcement structures in fiber-plastic composites—which is the basic technical field to which the invention belongs—since the threads are in a stretched form and therefore there is no additional structural stretch and the orientation of the threads can be specifically defined for the respective application.

In order to be able to produce rims with a corresponding rim body which are particularly highly resistant to stresses and loads it has turned out to be of advantage if the NCF is a monoaxial/unidirectional or biaxial (e.g. +/−45° fibers-containing) non-crimp fabric or a multiaxial non-crimp fabric, preferably made of carbon fibers, glass fibers or aramid fibers.

The rim body will be able to bear particularly high forces with a low weight when the first subpreform and/or the second subpreform and/or the third subpreform comprises/comprise several, for instance 3, 4, 5, 6, 7, 8 or more layers consisting of NCF, wherein preferably the first subpreform and the third subpreform have the same number of or a different number of layers and the second subpreform has various numbers of layers, in relative terms preferably more layers than the first subpreform and/or the third subpreform. Exactly said different distribution of layers will also have a positive influence on the later running characteristics of the vehicle using said vehicle rim. The adaptation of the layers and of the number for each preform increases the optimization possibilities and, thus, the lightweight construction potential. It is, however, not necessary that it is different.

It is useful if the first subpreform and/or the third subpreform have an NCF on which a roving bundle is fixed, wherein for instance said combination is preferably wound up in multiple layers. By the use of a roving bundle, the later rim edge can be worked out in a better way. Then the high tensile forces occurring thereat can be coped with satisfactorily.

"Rovings" are understood to mean fiber filaments, in particular chemical fiber filaments. Here a "roving" is understood as a bundle, strand or multifilament yarn made of filaments/continuous fibers arranged in parallel. The cross-section of a "roving" is often elliptical or rectangular. Those ravings that have a slight protective twist, for instance five or ten twists per meter, which makes the cross-section more rounded, shall be comprised herein. In this connection, in particular filaments made of glass, aramid, or carbon form a roving.

When the roving bundle includes several, for instance 3, 4, 5, 6, 7, 8, 9, 10, 11, 12, 13, 14, 15 or more rovings which are preferably twisted with each other, for instance 5, 6, 7, 8, 9 or 10 twists per meter +/−2 to 3, or which run in parallel to each other, and/or are entwined or wrapped by a positioning thread, like a glass fiber thread or a carbon fiber thread, even the roving bundle itself brings along an excellent rigidity for the processing as well as also for the later use of the entire rim body.

In order that the production can take place rapidly and that a machine-based production can be utilized, it is advantageous if the roving bundle is sewn on the NCF, for instance by means of a zigzag seam following the longitudinal direction of the roving bundle and of the NCF. In this connection it has turned out to be advantageous if a change of direction of the thread of the zigzag seam will occur every 15 mm and if the width of the seam as measured at right angles to the longitudinal direction of the roving bundle is 7 mm. Here it is favorable if the zigzag seam is spaced apart from the edge of the roving extending in the longitudinal direction of the NCF for instance $1/10$ of the width. Here it is of advantage if the width of the entire roving bundle is approximately 10 mm+/−2 mm.

The ratio of rigidity to weight is particularly advantageous if the first subpreform and/or the third subpreforrm is/are wound up/structured with 4, 5, or 6 layers, and/or if the second subpreform is wound up/structured with 5, 6 or 7 layers. Also more layers, for instance 8, 9, 10, etc., are possible.

At present there are only three subpreforms. In future, however, there can be added further subpreforms (top layers, local thickenings, etc.). The three subpreforms can be supplemented by further "sub-subpreforms". In practice this means additional visible layers also because of the visual appearance, because of the thermal protection and in order to achieve local additional reinforcements.

The three subpreforms can be additionally supplemented by the simultaneous winding up of rovings or strips together therewith. As a result thereof there are obtained areas in the circumferential direction which comprise additionally also fibers in the circumferential direction.

It is also possible to wind additional 0° rovings in the circumferential direction onto the second subpreform in the area of the connection and to further reinforce said area thereby.

When that part of the NCF layers of the first subpreform and/or of the third subpreform that adjoins the roving bundles, completely or partially, but the region comprising all layers, are fixed at each other via a preferably thermally activated binder such that they cannot slip. In this way, the area on one side of the roving bundle that is not provided with a binder can later on easily be turned over (turned inwards or outwards)/everted or inverted/folded over/flipped over, whereas the area on the other side of the roving bundle that is provided with the binder remains hard and cannot slip. This is advantageous for the production. The precision of the rim body will be particularly good and high.

When said area on which the binder is applied is (only) present on the outside of the vehicle rim, i.e. radially outward of the respective connecting cavity, the turning over/flipping over of the remaining part of the rim body defining the shape of the vehicle rim is easily possible beginning in the section of the incorporated roving bundle, even by hand force. It shall be noted that the turning over (turning inwards or outwards) can also be designated as everting or inverting, folding over or flipping over.

One advantageous embodiment is also characterized in that the second subpreform is fixed at the first subpreform and/or at the third subpreform (also) by means of a (3D) seam penetrating the respective connecting cavity. Thereby the coherence of the individual parts is increased.

A further embodiment refers to such a rim body configuration in which the roving bundle is spaced apart from a longitudinal edge of the NCF by between $5/12$ to $6/13$+/−10% of the width of the NCF. In this manner, the roving bundle is positioned eccentrically which accounts for more material for the turning over/flipping over/folding over/inverting or everting.

It is also advantageous if the roving bundle, with the section of the NCF at which it is attached, across several layers, forms a rim flange for the mounting of a tire. In this connection, winding and crimping or turning processes are suitable.

It is particularly suitable to evert or invert or turn over a part of the rim body on one side of the roving bundle in order to achieve this.

When an NCF section lies on the outside or on the inside of the rim in the area of the rim flange or a roving bundle lies on the inside or outside thereof, said area can be efficiently used for a later introduction of the forces of the tire.

The method can advantageously also be improved by the fact that one Roving bundle (respectively) will be sewed on the NCF of the first subpreform and/or of the third subpreform in the longitudinal direction (respectively).

When a section of the NFC of the first subpreform and/or of the third subpreform that preferably lies on the outside in the final product and covers all layers, adjoining the roving bundle, will be provided or sprinkled, brushed or sprayed with a thermal binder and (then) cured/hardened, a particularly precise component can be obtained.

In this connection it is favorable if the area of the roving bundle and only the directly adjoining area will be compressed and/or cooled prior to the curing/hardening of the binder.

Furthermore it is advantageous if, after the activation of the for instance thermal binder, the, when viewed from the roving bundle, other, binder-free part of the first subpreform and/or of the third subpreform is turned inwards/inverted inwards in order to bind a cavity/(front and/or rear) connecting cavity revolving into the rotational axis of the rim body between the portion comprising the binder and the binder-free portion.

In this way, a coupling area is created which can be used for the connection of two subpreforms, respectively.

When, after the turning over of the layers of the first subpreform and/or of the third subpreform, the second subpreform will be inserted into the respective cavity/ connecting cavity, then the basis for a compact, integral, one-piece rim body is created.

In this connection it is favorable if the first subpreform, the second subpreform and the third subpreform are infiltrated simultaneously with resin and that these three components are cured together. It is useful to charge the three subpreforms with resin by means of an RTM (Resin Transfer Molding) injection. A roller or two rollers for pressing on are used, wherein at least one roller is coolable/is cooled/will be cooled. Principally, all areas of the NCF can be charged with a thermal binder. Then it is, however, sensible to cure only one area on the one side of the roving bundle, i.e. to "activate" a binder (which means for instance to heat it up and/or to cool it down, so that it will glue the fibers together), and to cure, i.e. to activate the other area on the other side of the roving bundle only after the turning over/inverting or everting/folding over and flipping over of the other area (i.e. offset in time). As a matter of course it is advantageous if the beginning and the end of an NCF is present at the same location or with a possible (smaller) overlapping when viewed in the circumferential direction of a winding core. For the application of pressure and heat preferably on one side of the roving bundle there can be used pressure rams or press rollers.

Alternatively it is also possible to use at least/only one steel roll for the pressing on and the cooling and to use additionally a plastic roller with a groove for the positioning of the area with the sewed-on roving bundle. Said device can be incorporated into a wind-up unit.

Figure 2:
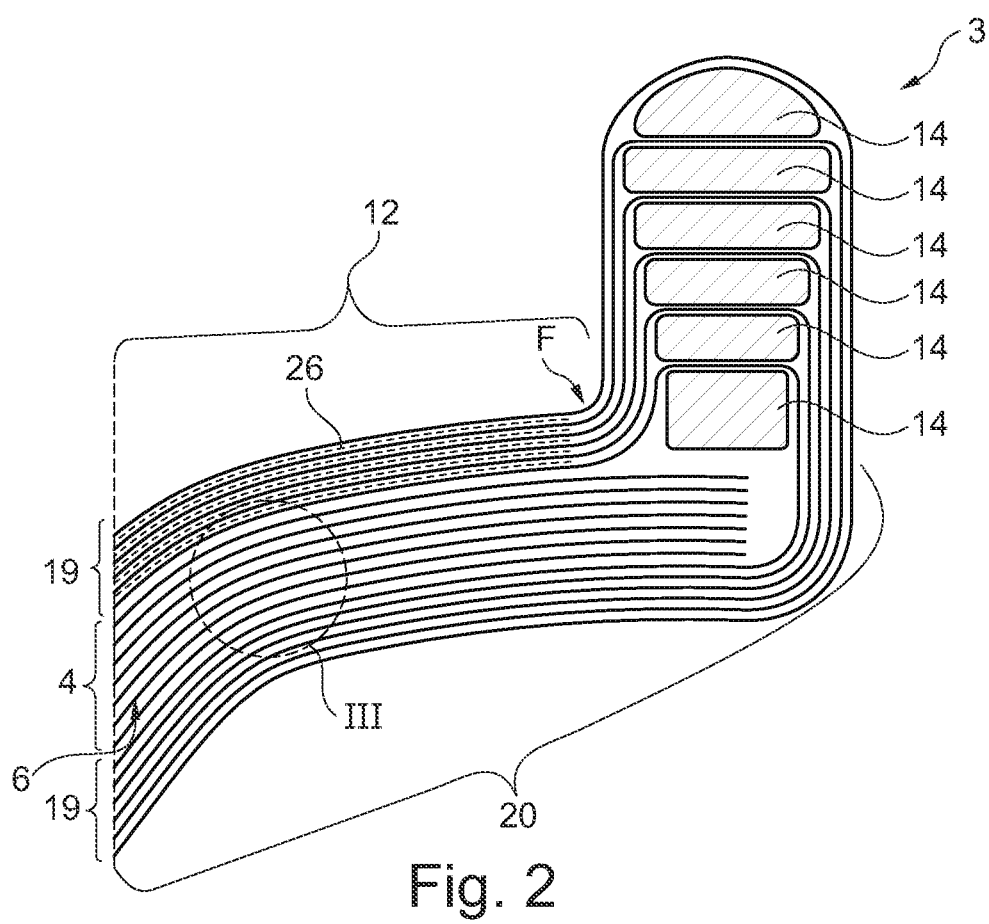
Figure 3:
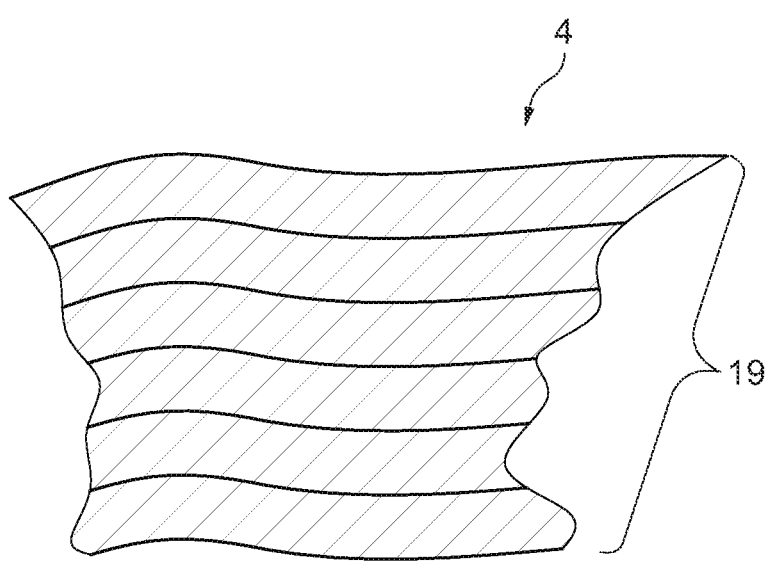
Figure 4:
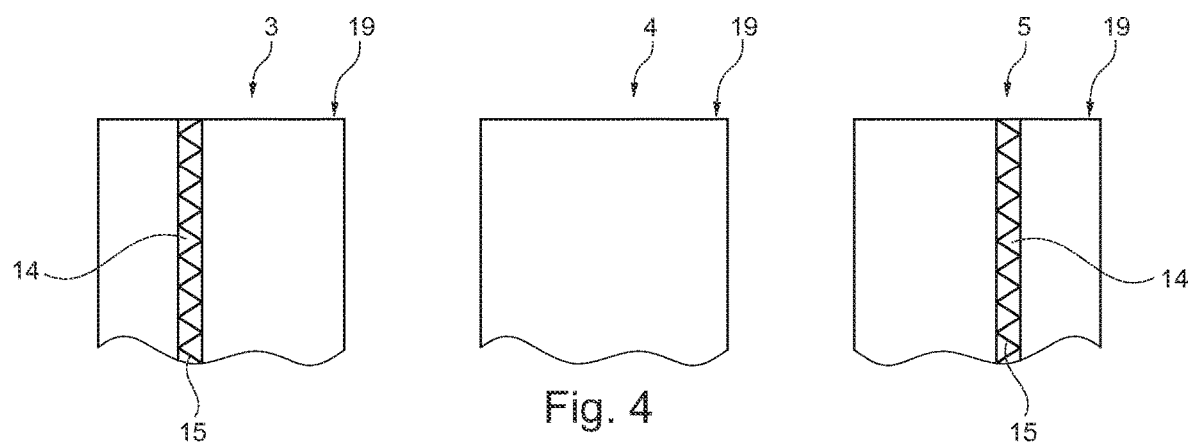
Figure 5:
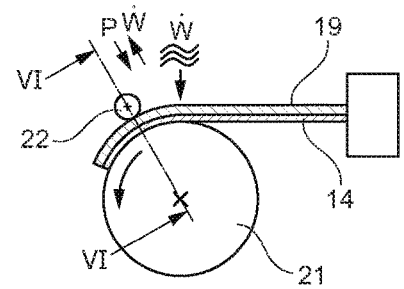
Figure 6:
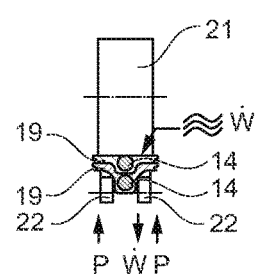
Figure 7:
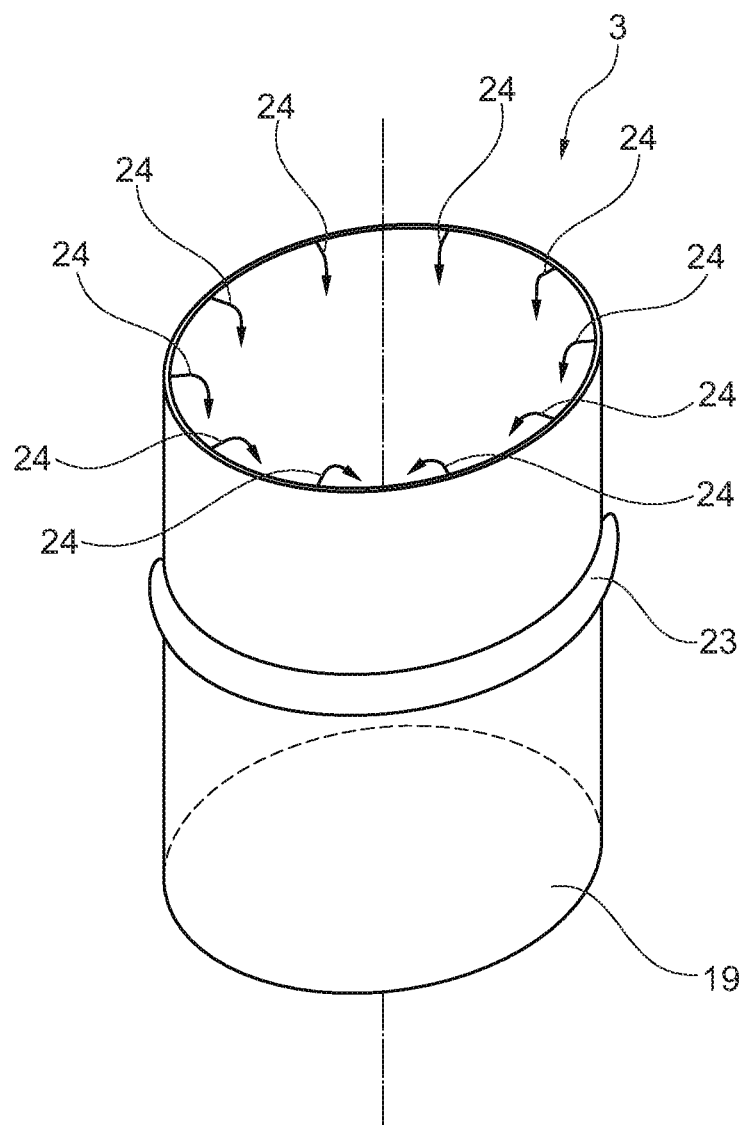
Figure 8:
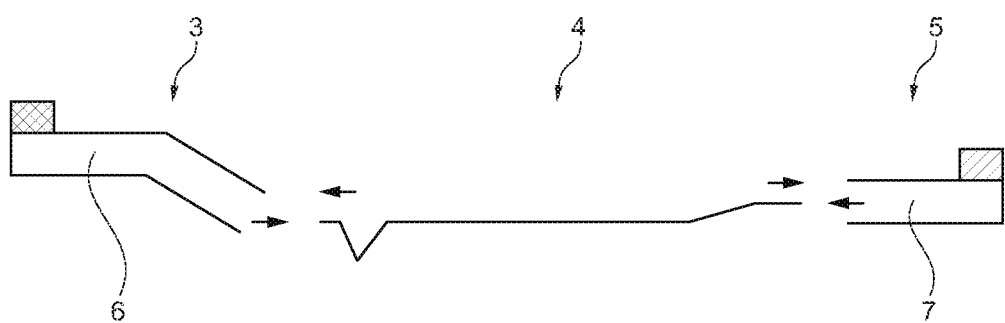

In the following, the invention will be explained also by means of a drawing in which on the one hand the device, i.e. the vehicle rim, and on the other hand the method for the production will be described in more detail, wherein in the drawings:

FIG. 1 shows a partially represented cross-section through a vehicle rim comprising a rim body according to the invention made of fiber composite material, with an indicated tire mounted thereon, FIG. 2 shows a magnification of section II of FIG. 1 with a second subpreform fixed in the first subpreform, FIG. 3 shows a magnification of section III of FIG. 2 through the second subpreform, FIG. 4 shows a plan view of the NCF of the first to third subpreforms, wherein a roving bundle is sewn on the NCF of the first and third subpreforms, respectively, FIG. 5 shows the process of the winding-up of the first or third subpreform with the NCF on which the roving bundle is attached, for the formation of several layers, FIG. 6 shows a section along line VI through the structure of FIG. 5 with two press rollers, wherein one of said press rollers is used for discharging heat which was applied at an earlier point of time on a one-sided area of the subpreform 1 or the subpreform 3 when viewed from the roving bundle, FIG. 7 shows a schematical representation of the basic form of the first subpreform or second subpreform at the moment of the turning inwards for the creation of the front or rear connecting cavity, wherein also a turning outwards is possible, and FIG. 8 shows the assembling or putting together of the three individual subpreforms.

The figures are merely of a schematical character and only contribute to a better understanding of the invention. The same elements are provided with the same reference numerals.

In FIG. 1 there is indicated a vehicle rim 1. It comprises a rim body 2. The rim body 2 is constructed with a fiber composite material cured in the final state, the fiber composite material comprising reinforcement threads, for instance carbon fiber threads, glass fiber threads and/or aramid fiber threads, embedded in a resin matrix. Also mixtures of the different threads are possible. The rim body 2 is composed of a plurality of individual parts comprising a first subpreform 3, a second subpreform 4 and a third subpreform 5.

The first subpreform 3 and the third subpreform 5 are inverted or everted/turned over/flipped over in such a manner that a front connecting cavity 6 or respectively a rear connecting cavity 7 is formed in its interior. Said two connecting cavities 6 and 7 are also cavities which are formed by the material of the respective first subpreform 3 or respectively the third subpreform 5. The two connecting cavities 6 and 7 comprise ends of the second subpreform 4, wherein said ends are provided with the reference numerals 8 and 9.

Between end 8 of the second subpreform 4 and the material of the first subpreform 3, respectively between end 9 of the second subpreform 4 and the material of the third subpreform 5, there is located a resin/a resin mixture 10. Said resin 10 can/shall be the same or even the identical resin/resin mixture which infuses/penetrates all three subpreforms 3, 4 and 5. It can, however, be different thereto. In particular it can be replaced by a binder 11, for instance a thermal binder, which is present in the binder area 12. The binder area 12 is present axially within a roving bundle area 13. More precisely, for the production of the preform and for the connection of the subpreforms a binder powder is used. The resin will be added only during the injection of the entire, already assembled preform during the RTM injection. Then the binder powder will dissolve itself in the resin mixture during the injection.

The roving bundle section 13 is that section of the first subpreform 3 or respectively of the third subpreform 5 in which one roving bundle 14 is incorporated per subpreform 3 or 5. The roving bundle 14 is composed of eleven ravings which have five or ten twists per meter. For an attaching incorporation thereof there can be used a seam 14 which is indicated with a dot-and-dash line.

The ends 8 and/or 9 can be inserted at the respective first subpreform 3 or third subpreform 5 with a (3D) seam 16 additionally or alternatively to the resin contained in the connecting cavities 6 or 7. A tire 17 to be mounted later on the rim body 2 is indicated with a dashed line. In the course of this, the tire 17 engages into the area of rim flanges 18 which is formed by the roving bundle area 13.

In FIG. 2 there is shown the first subpreform 3 in more detail. It becomes obvious that several layers of a (single) NCF material 19 with (just one) applied roving bundle 14 are used. For simplification purposes, the seam 15 which is for instance formed as a zigzag seam is not represented.

The engagement of the second subpreform 4 into the front connecting cavity 6 by interposing the resin/resin mixture 10 can be clearly recognized.

In a particular embodiment, however, the ends/edges of the NCF 19 are not turned over, i.e. inwards or outwards, but simply lie on top of each other or with an offset at the same location. The assembly of the three subpreforms 3, 4 and 5 can be carried out simultaneously with the eversion or inversion. When the eversion or inversion is carried out first, then they can no longer be plugged together.

There are formed for instance six layers, wherein, in the end, an approximately 9 m long continuous NCF material piece 19 comprising the sewed-on roving bundle 14 is wound up several times such that those six layers are obtained. Also five layers are conceivable, as well as more or less layers, depending on the load or stress to be expected. While on the one side of the front connecting cavity 6 the binder area 12 is present, a binder-free area 20 is present on the other side. Said binder-free area 20 eventually extends up to the roving bundle 14.

The fact that also the second subpreform 4 is formed of several layers of an NCF material 19 can be inferred from FIG. 3. Here seven layers of a 600 gr/m² material with +45° threads are used.

Between the winding layers there are inserted additional rovings 26. The same is true for the second subpreform 4 in a further embodiment.

In FIG. 4 there is represented the basic material, namely the NCF material 19, for the first subpreform 3, the second subpreform 4 and the third subpreform 5. The first subpreform 3 uses NCF material that is approximately twice as heavy per square meter than the third subpreform 5. Both subpreforms are based on a biaxial non-crimp fabric with +1-45° threads. The first subpreform 3 is broader by approximately 8%+/−3 than the third subpreform 5. The length of the sections of the NCF material 19 are of equal size, for instance 9 m. With a width of 14 cm of the basic material of the first subpreform 3, conveniently said five layers can be wound, respectively. Prior to the winding, however, the respective roving bundle 14 will be sewed on the NCF material 19 of the first subpreform 3 and of the third subpreform 5 by means of the (zigzag) seam 15.

The winding up of the NCF material 19, for instance comprising the sewn-on roving bundle 14, is visualized in FIG. 5. In this connection there is a winding roll 21, preferably made of wood. Wood has proved to be successful as it provides an almost optimal elastic modulus. Here, two rollers 22 press the NCF material 19 and indirectly also the roving bundle 14 in the direction of the winding roll 21.

The application of pressure (P) is also indicated in FIG. 6, wherein in FIG. 6 it is recognizable that the two rollers 22 are spaced apart from each other by the width of the roving bundle 14. The rollers 22 are preferable made out of steel.

In a synopsis of FIG. 5 and FIG. 6 it becomes clear that, at a location positioned before the rollers 22, heat will be supplied which will then be discharged again subsequently by at least one of the two rollers 22. The application of heat takes place via a heat gun/a heat flow, for instance by means of a blower, a laser, an infrared lamp or a hot air gun.

In FIG. 7 there is indicated the thickened collar 23 at the first subpreform 3 which is created by the incorporated roving bundle 14. The direction of turning over is indicated with the arrows 24.

In FIG. 8 there is shown the direction of the assembling or putting together of the three subpreforms 3, 4 and 5 by means of the arrows 25. When the three subpreforms 3, 4, 5 have been assembled, then resin will be injected into said subpreforms and then they will be cured by applying heat and pressure.

Where appropriate, thereafter still the coupling of a wheel center made of a light metal alloy will take place in order to obtain the finished vehicle rim.

LIST OF REFERENCE NUMERALS 1 vehicle rim
2 rim body
3 first subpreform
4 second subpreform
5 third subpreform
6 front connecting cavity
7 rear connecting cavity
8 end of the second subpreform
9 end of the second subpreform
10 resin/resin mixture
11 binder
12 binder area
13 roving bundle area
14 roving bundle
15 seam
16 (3D) seam
17 tire
18 rim flange
19 NCF material
20 binder-free area
21 winding roll
22 roller
23 thickened collar
24 arrow/direction of turning over
25 arrow/direction of the assembling or putting together
26 additional roving

What is claimed is:

1. A vehicle rim with a rim body made of fiber composite material, comprising a first subpreform at a first axial end and a third subpreform at the opposite second axial end, wherein a second subpreform is arranged between the first subpreform and the third subpreform, wherein the second subpreform engages into a front connecting cavity being formed by the first subpreform as well as also into a rear connecting cavity being formed by the third subpreform, wherein the first subpreform and/or the second subpreform and/or the third subpreform includes an NCF material, and the vehicle rim further includes a roving bundle which is attached to the first subpreform and/or the third subpreform, and wherein the vehicle rim further includes a seam which sews the roving bundle on the NCF material.

2. The vehicle rim according to claim 1, wherein the second subpreform is fixed in the two connecting cavities at the first subpreform and the third subpreform.

3. The vehicle rim according to claim 1, wherein all three subpreforms are penetrated by the same resin/resin mixture.

4. The vehicle rim according to claim 1, wherein the NCF material is a monoaxial/unidirectional or biaxial or multiaxial non-crimp fabric.

5. The vehicle rim according to claim 1, wherein the first subpreform and/or the second subpreform and/or the third subpreform comprises/comprise several layers of NCF.

6. The vehicle rim according to claim 1, wherein the roving bundle includes several rovings.

7. The vehicle rim according to claim 1, wherein the NCF material has a flat structure, and the roving bundle has a bundle structure.

8. A method for the production of a vehicle rim with a rim body made of fiber composite material, wherein an NCF material comprising carbon fibers, glass fibers and/or aramid fibers is created for the formation of a first subpreform for a first axial end of the rim body and of a third subpreform for the opposite axial end of the rim body with a connecting cavity, wherein a second subpreform made of the NCF material is inserted into the connecting cavity and is fixed thereat, wherein the method further includes attaching a roving bundle on the NCF material of the first subpreform and/or the NCF material of the third subpreform, and wherein the roving bundle is sewn on the NCF material of the first subpreform and/or the NCF material of the third subpreform.

9. The method as claim in claim 8, wherein the first subpreform is twice as heavy per square meter than the third subpreform.

10. The method as claim in claim 8, wherein both of the first and third subpreforms are based on a biaxial non-crimp fabric with +/−45° threads.

11. The method as claim in claim 8, wherein the first subpreform is broader by 8%+/−3 than the third subpreform.

12. The method as claim in claim 8, wherein a length of sections of the NCF material of both of the first and third subpreforms are of equal size.

13. A method for the production of a vehicle rim with a rim body made of fiber composite material, wherein an NCF material comprising carbon fibers, glass fibers and/or aramid fibers is created for the formation of a first subpreform for a first axial end of the rim body and of a third subpreform for the opposite axial end of the rim body with a connecting cavity, wherein a second subpreform made of the NCF material is inserted into the connecting cavity and is fixed thereat, wherein the method further includes attaching a roving bundle on the NCF material of the first subpreform and/or the NCF material of the third subpreform, and wherein the first subpreform is twice as heavy per square meter than the third subpreform.

14. The method as claim in claim 13, wherein both of the first and third subpreforms are based on a biaxial non-crimp fabric with +/−45° threads.

15. The method as claim in claim 13, wherein the first subpreform is broader by 8%+/−3 than the third subpreform.

16. The method as claim in claim 13, wherein a length of sections of the NCF material of both of the first and third subpreforms are of equal size.

\* \* \* \* \*